UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS OF CONVERTING ACETYL CELLULOSE.

1,041,116. Specification of Letters Patent. Patented Oct. 15, 1912.

No Drawing. Application filed November 27, 1911. Serial No. 662,743.

*To all whom it may concern:*

Be it known that I, WILLIAM G. LINDSAY, a citizen of the United States, residing in Caldwell, county of Essex, State of New Jersey, have invented certain new and useful Improvements in Process of Converting Acetyl Cellulose, of which the following is a specification.

The various compositions to which the present invention relates are employed in the arts, generally as imitations of natural substances, sometimes in their original finished form with or without incorporated colors and other inert substances, and sometimes as films which are used for photographic and other purposes.

Although the final or useful form of the different compounds of acetyl cellulose is that of a solid material, the different processes of conversion into this final solid form involve, as is well understood, the employment of solutions or mixtures of varying consistency as to plasticity, stiffness, or fluidity, depending generally upon the proportion and kind of solvent used to the amount of the original base,—acetyl cellulose.

It has been known for many years that camphor and ethyl alcohol in admixture form a solvent for nitrocellulose in the cold or at room temperature, and also that the camphor can be mixed with the nitrocellulose and that the subsequent addition of ethyl alcohol causes solution or conversion of the nitrocellulose. I have found, however, that when that process is applied to acetyl cellulose no solvent action takes place and the object of my invention was to find a method not only of using ethyl alcohol and camphor so as to exert a solvent action upon that variety of acetyl cellulose which is soluble in acetone, but also to find substances that can be added to the mixture so as to render the final product practically non-inflammable.

In the course of my experiments I have found that by using heat a mixture of camphor and ethyl alcohol will dissolve that variety of acetyl cellulose which is soluble in acetone, so that while neither camphor nor ethyl alcohol by themselves, or in admixture, are solvents of this variety of acetyl cellulose in the cold, yet they become such solvent when used in certain proportions and are heated to the proper degree. These proportions of ingredients and degrees of heat are important in practising my invention. I have further found that triphenylphosphate or tricresylphosphate, or a substance similar to these two, in proper admixture, will not prevent the solvent action of the other ingredients named upon the acetyl cellulose, and that their addition serves to render the resulting product substantially non-inflammable.

As one example of carrying out my invention, I take 100 parts of an acetyl cellulose which is soluble in acetone and grind it or otherwise mix it with from, say, 15 to 35 parts of camphor and about 10 to 25 parts of either triphenylphosphate or tricresylphosphate so that there is a thorough mixture of the ingredients. I then add from about 40 to 50 parts of ethyl alcohol and stir until a substantially uniform mixture is produced. I then allow the mass to soak or macerate for from 12 to 24 hours in a closed vessel in order to secure good penetration. To this mixture heat is then applied by means of a boiling water bath or a steam bath of about 100° C. The mixture can also be manipulated by kneading or malaxating under the influence of the described temperature and then subjected to pressure in a suitable mold or form or by other suitable means, while it is still hot. When a compact mass or cake has been thus produced it is cooled while still under pressure and in this way a solid mass is produced which is suitable for cutting into sheets or other forms; or, the mold may be of such form that the finally desired shape may be given to the object by this one operation. The sheets or other objects produced by this method are then subjected to the drying or seasoning process which is common to the art.

It will be readily understood that slight variations in the proportions of the ingredients named may be employed, but I prefer to use the proportions specified.

Of course, if desired, the ethyl alcohol can be incorporated with the acetyl cellulose first without departing from the spirit of my invention because it exerts no solvent action by itself upon the cellulose and the camphor and either one or both of the phosphates can be added subsequently to the mixture; or, again, the camphor and alcohol can be mixed together and poured upon the cellulose before either one or both of the phosphates are added because it will be understood that no solvent action will take place until heat has been applied as described, and it is in this discovery that my invention lies.

It will also be understood that coloring matters and other inert substances may be incorporated, if desired.

Having thus described my invention, what I claim is:—

1. The process of dissolving or converting an acetyl cellulose that is soluble in acetone which consists in dissolving or converting said acetyl cellulose by the use of camphor and ethyl alcohol in the presence of one or more of the group of phosphates described (triphenyl phosphate, tricresyl phosphate), substantially as set forth.

2. The process of dissolving or converting an acetyl cellulose that is soluble in acetone which consists in (1) mixing said acetyl cellulose with camphor and one or more of the group of phosphates described) triphenyl phosphate, tricresyl phosphate) and (2) adding ethyl alcohol, substantially as set forth.

3. The process of dissolving or converting an acetyl cellulose that is soluble in acetone which consists in dissolving or converting said acetyl cellulose by the use of camphor and ethyl alcohol in the presence of one or more of the group of phosphates described (triphenyl phosphate, tricresyl phosphate) together with coloring matters or other inert substances, substantially as set forth.

WILLIAM G. LINDSAY.

Witnesses:
J. E. HINDON HYDE,
MABEL DENTON.

Copies of this patent may be obtained for five cents each, by addressing the "Commissioner of Patents, Washington, D. C."